United States Patent [19]

Umland et al.

[11] Patent Number: 4,696,753

[45] Date of Patent: Sep. 29, 1987

[54] LUBRICANT FOR A TIRE AND WHEEL ASSEMBLY

[75] Inventors: Henning Umland, Winsen/Luhe; Gerhard Fricke, Bad Münder, both of Fed. Rep. of Germany

[73] Assignee: Continental Gummi-Werke Aktiengesellschaft, Hanover, Fed. Rep. of Germany

[21] Appl. No.: 887,818

[22] Filed: Jul. 17, 1986

[30] Foreign Application Priority Data

Jul. 24, 1985 [DE] Fed. Rep. of Germany ....... 3526428

[51] Int. Cl.$^4$ .......................................... C10M 103/04
[52] U.S. Cl. ...................... 252/26; 252/12; 252/52 R
[58] Field of Search ............... 252/26, 52, 12

[56] References Cited

U.S. PATENT DOCUMENTS

| 4,096,075 | 6/1978 | Nakamura | 252/12 |
| 4,189,194 | 2/1980 | Davis | 252/12 |
| 4,608,085 | 8/1986 | Euder et al. | 252/26 |

*Primary Examiner*—Jacqueline V. Howard
*Attorney, Agent, or Firm*—Becker & Becker, Inc.

[57] ABSTRACT

A lubricant for a tire and wheel assembly to reduce friction between the inner wall of a tire and the rim or other parts of the vehicle wheel. The lubricant comprises 50 to 70% by weight of polyethylene glycol and/or polyglycol ether, 49 to 27% by weight aluminum bronze, and 1 to 3% by weight of a wetting agent.

6 Claims, 2 Drawing Figures

LUBRICANT FOR A TIRE AND WHEEL ASSEMBLY

BACKGROUND OF THE INVENTION

The present invention relates to a lubricant for a tire and wheel assembly to reduce friction between the inner wall of a tire and the rim or other parts of the vehicle wheel, with the lubricant containing, among other things, polyethylene glycol (polyglycol) and/or polyglycol ether.

United Kingdom Pat. No. 1,359,469, which is being incorporated into this disclosure by this reference thereto, discloses a number of materials that appear suitable for use as a lubricant; one of these materials is polyethylene glycol. The task of such a lubricant is to prevent damage or destruction of the tire due to slippage when the tire is operated for a long period of time in a deflated state. This is to be accomplished by reducing the friction between the inner wall of the tire and the rim or other parts of the vehicle wheel as they make contact when the tire is supported on the ground. Reduction of friction should also prevent an excessive amount of heat from being generated.

Various requirements are imposed for such lubricants for a tire and wheel assembly. For example, such lubricants should be able to maintain a high viscosity over as great a temperature range as possible. They cannot weigh much, so that they do not have too great of an effect upon the negative balance within the framework of an energy-optimized tire and wheel assembly. Furthermore, such lubricants cannot have too great of a tendency to flow, and must adhere to a sufficient degree to the rim or to the tire in order to assure a uniform distribution of the lubricant over the periphery of the tire or wheel even for long periods of time, and during the high contrifugal forces that are encountered during operation.

Unfortunately, none of the heretofore known lubricants has gained universal acceptance, because up to now none of the lubricants could simultaneously fulfill all of the requirements to a sufficient degree.

It is therefore an object of the present invention to provide an improved lubricant for tire and wheel assemblies.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

The lubricant of the present invention comprises 50 to 70% by weight of polyethylene glycol (polyglycol) and/or polyglycol ether, as well as 49 to 27% by weight aluminum bronze and 1 to 3% by weight of a wetting agent.

As a consequence of the inventive addition of aluminum bronze to the polyethylene glycol, the lubricating ability of the lubricant is significantly improved. The indicated percentages cover a range in which the lubricant that is obtained is neither too liquid nor too firm. As is known, a pure polyethylene glycol exists either in the liquid phase or as a wax that has a low melting point. By adding a suitable amount of aluminum bronze, a pasty lubricant is obtained, whereas if too much aluminum bronze is added, the lubricant would assume a crumbly consistency. A particularly advantageous lubricant is one where the ratio of the percentages by weight between the low-molecular polyethylene glycol and the aluminum bronze is approximately 6:4. In order to achieve a satisfactory wettability, it is expedient to add approximately 2% by weight of a wetting agent to the lubricant. It is furthermore recommended that a corrosion inhibitor be added to the lubricant, and in particular at a rate of approximately 0.5 to 2% by weight. Examples of such corrosion inhibitors are those encountered with light metals.

The lubricant should be applied as a layer having a thickness of between 0.1 and 0.8 mm.

The inventive lubricant has the advantage that it is stable for a very long period of time, and is very compatible with rubber. Furthermore, when the inventive lubricant is used, the vehicle can be operated over a long distance and at relatively high speeds during emergency operation of the tire and wheel assembly.

The lubricant can be applied to the inner wall of the tire below the tread strip, or can be applied on support surfaces of the rim or on other support elements, for example on rigid support rings or on support hoses. If desired, the lubricant can of course, also be disposed on other locations of the tire or of the rim, and can also be simultaneously disposed on the rim and on the tire.

DESCRIPTION OF PREFERRED EMBODIMENTS

Figure 1:
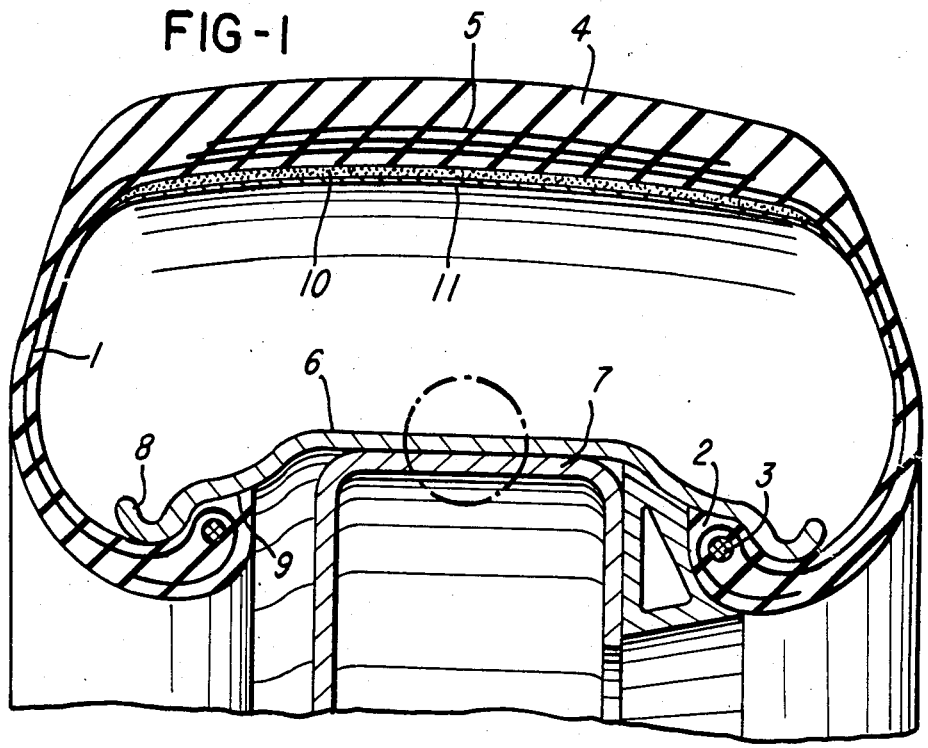
FIG. 1 is a radial partial cross-sectional view of a tire and wheel assembly showing the invention lubricant layer on the inner wall of the tire below the tread strip.

Referring now to the drawing in detail, the pneumatic vehicle tire utilized with the wheel of FIG. 1 is essentially made of rubber or rubberlike material, and includes a radial carcass 1 that is anchored in the beads 2 by being looped around the pull-resistant bead cores 3. Disposed below the tread strip 4, between the latter and the carcass 1, is a belt 5 that is pull-resistant in the circumferential direction of the tire, comprises two or more cord plies, and effects the side stabilization of the tire body.

The metal rim 6 is welded to the well 7 in a manner known per se. This rim 6 serves for mounting the tire bead 2, and for supporting the tire during an emergency operation, i.e. when driving after the tire has somehow failed and the air has escaped therefrom. When viewed in cross-section, the rim 6 has laterally outwardly disposed respective rim flanges 8 that extend radially inwardly. Disposed axially inwardly of each rim flange 8, and adjacent thereto on the inner periphery of the rim 6, is a respective seating surface 9 for the tire beads 2.

The radially outer side of the rim 6, in an extremely wide central region, is provided with a nearly cylindrical surface. When viewed in cross-section, this surface can be slightly curved in the event that the tire fails, the zenith portion of the tire can be completely supported upon this surface without material change in the shape of the tire. Since at the same time the side wall regions of the tire can bulge outwardly, there is assured that in the event that the tire fails no buckling of the tire will occur.

To prevent excessive heat from being generated due to friction between the tire and the aforementioned surface of the rim 6, the inner wall of the tire in the region below the tread strip 4, is provided with a layer of lubricant 10. Pursuant to one preferred embodiment, the lubricant layer 10 comprises 62% by weight of a low-molecular polyethylene glycol (polyglycol), 37% by weight aluminum bronze, and 1% by weight of a non-ionic surfactant as a wetting agent. The inventive lubricant layer can also comprise other proportions of the aforementioned constituents. However, the polyethylene glycol should be present in the proportion of from 50 to 70% by weight, with the aluminum bronze comprising 49 to 27% by weight and the wetting agent comprising 1 to 3% by weight. It is also possible to use polyglycol ether in place of the polyethylene glycol. Examples of wetting agents are surface active fatty alcohol polyglycol ethers or fatty acid polyethylene glycol esters.

To produce the inventive lubricant, the wetting agent is first added to the liquid polyethylene glycol. The aluminum bronze is then stirred into the liquid until a homogeneous mixture results and a paste is obtained that is not too crumbly. Finally, a corrosion inhibitor should also be mixed in.

It has been proven that thicknesses of 1/10 to a maximum of 8/10 mm for the lubricant layer 10 are entirely adequate, so that with regard to the energy balance, the increase in weight of the tire is negligible.

The tires of the aforementioned tire and wheel assembly were provided with the inventive lubricant layer 10. These assemblies were then mounted on a vehicle, and without inflating the tire the vehicle was first driven for 50 km at a speed of 40 km/h. The vehicle was thereafter driven for 100 km at a speed of 80 km/h. Subsequent inspection of the tires showed that not only the tires themselves, but also the lubricant layers 10, remained completely operable. In some tests, the vehicles were driven well over 400 km without damaging the inner surface of the tire that was subjected to friction.

In order to make it easier to handle the tire while the latter is being mounted, for example to protect the person mounting the tire from getting dirty from the lubricant, it would be possible to cover the lubricant layer 10 with an extremely thin and possibly perforated foil or thin sheet 11, for example of polyethylene.

Figure 2:
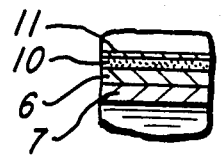
FIG. 2 shows a portion of the wheel of FIG. 1 in the region of the rim, with the inventive lubricant layer being provided on the surface of the rim.

The modified embodiment of FIG. 2 shows a portion of the wheel of FIG. 1 in the rim region, with the surface of the rim being provided with a lubricant of the aforementioned type, and also possibly being provided with a cover foil or sheet 11. Pursuant to the present invention, it is possible to provide the lubricant either on the rim or on the tire only, or on both the rim and the tire.

The present invention is, of course, in no way restricted to the specific disclosure of the specification and drawings, but also encompasses any modifications within the scope of the appended claims.

What we claim is:

1. A lubricant for a tire and wheel assembly to reduce friction between the inner wall of a tire and the rim or other parts of the vehicle wheel, said lubricant comprising:
   50% to 70% by weight of at least one of the group consisting of polyethylene glycol and polyglycol ether;
   49 to 27% by weight aluminum bronze; and
   1 to 3% by weight of a wetting agent.

2. A lubricant according to claim 1, which comprises 37% by weight aluminum bronze, 1% by weight of a wetting agent, and 62% by weight of at least one of the group consisting of polyethylene glycol and polyglycol ether.

3. A lubricant according to claim 1, in which said wetting agent is a surface active fatty alcohol polyglycol ether.

4. A lubricant according to claim 1, in which said wetting agent is a surface active fatty acid polyethylene glycol ester.

5. A lubricant according to claim 1, which further includes 0.5 to 2% by weight of a corrosion inhibitor.

6. A lubricant according to claim 1, which is in the form of a 0.1 to 0.8 mm thick layer that is disposed on at least one of the group consisting of said inner wall of a tire and the rim or other parts of the vehicle wheel.

* * * * *